US005379865A

United States Patent [19]

Berdich et al.

[11] Patent Number: 5,379,865

[45] Date of Patent: Jan. 10, 1995

[54] SURFACE MOUNTED INDICATING ELEMENT FOR ELEVATORS

[75] Inventors: Edward Berdich; Peter Draper, both of Honeybrook, Pa.; Timothy Shea, Little Falls, N.J.

[73] Assignee: Inventio AG, Hergiswil, Switzerland

[21] Appl. No.: 204,803

[22] Filed: Mar. 2, 1994

Related U.S. Application Data

[63] Continuation of Ser. No. 736,084, Jul. 26, 1991, abandoned.

[51] Int. Cl.[6] .................... B60B 3/00

[52] U.S. Cl. .................... 187/398; 187/395; 362/147; 340/815.45

[58] Field of Search ............... 187/1 R, 137, 135, 130, 187/100, 120; 220/2.1 R, 482; 248/900, 27.3, 27.1, 222.1; 362/147, 236, 362, 367, 368; 340/332; 345/32

[56] References Cited

U.S. PATENT DOCUMENTS

| | | | |
|---|---|---|---|
| D. 83,457 | 2/1931 | Lighthipe | D10/108 |
| 1,028,089 | 5/1912 | Herzog | 187/121 |
| 1,835,508 | 12/1931 | Lucas | 187/135 |
| 3,102,173 | 8/1963 | Damon | 200/11 |
| 3,174,023 | 3/1965 | Doggart | 200/167 |
| 3,364,330 | 1/1968 | Bassani | 200/168 |
| 3,367,206 | 2/1968 | Moody | 74/503 |
| 3,663,780 | 5/1972 | Golbeck . | |
| 3,733,043 | 5/1973 | Binns et al. | 248/225 |
| 3,918,052 | 11/1975 | Bricher | 340/366 |
| 4,019,607 | 4/1977 | Mandel et al. | 187/29 R |
| 4,032,882 | 6/1977 | Mandel et al. . | |
| 4,080,570 | 3/1978 | Pearson | 324/156 |
| 4,302,798 | 11/1981 | Sit | 362/147 |
| 4,417,113 | 11/1983 | Sato et al. . | |
| 4,480,163 | 10/1984 | Morris et al. . | |
| 4,504,713 | 3/1985 | Hennessey . | |
| 4,726,449 | 2/1988 | Orndorff et al. | 187/1 R |
| 4,742,198 | 5/1988 | Martin et al. . | |
| 4,822,963 | 4/1989 | Martin . | |
| 4,832,157 | 5/1989 | Kitano | 187/1 R |
| 4,840,584 | 6/1989 | Cox | 439/538 |
| 4,924,974 | 5/1990 | Orndorff et al. | 187/1 R |

FOREIGN PATENT DOCUMENTS

| | | | |
|---|---|---|---|
| 289845 | 8/1967 | Australia . | |
| 0403232 | 12/1990 | European Pat. Off. . | |
| 0406845 | 1/1991 | European Pat. Off. . | |
| 2355367 | 2/1978 | France . | |
| 9102425 | 5/1991 | Germany . | |
| 4-20491 | 1/1992 | Japan | 187/1 R |
| 270934 | 11/1966 | Switzerland . | |
| 412045 | 11/1966 | Switzerland . | |
| 588572 | 1/1978 | U.S.S.R. . | |

*Primary Examiner*—Steven L. Stephan
*Assistant Examiner*—Robert Nappi
*Attorney, Agent, or Firm*—Howard & Howard

[57] ABSTRACT

An elevator operational status indicating element includes a base plate with opposed bent ends mounted on a wall by screws. Pins are provided on the lower side wall of a housing open at the wall side to couple the housing with the lower bent end of the base plate. Setscrews are provided on the upper side wall of the housing to couple the housing with the upper bent end of the base plate. In the front wall of the housing an opening is provided into which a filter plate is set. Threaded bolts, attached near the opening on an inner face of the front wall of the housing, and nuts retain a lens carrier which is pressed against the filter plate. A printed circuit board in the lens carrier carries luminescent diodes in the form of a symbol to be displayed by light transmitted through a lens formed in the lens carrier to the filter plate.

9 Claims, 4 Drawing Sheets

SURFACE MOUNTED INDICATING ELEMENT FOR ELEVATORS

This is a continuation of copending application(s) Ser. No. 07/736,084 filed on Jul. 26, 1991 now abandoned.

BACKGROUND OF THE INVENTION

The present invention relates generally to a visual indicating apparatus and, in particular, to an indicating element for an elevator.

An element, which is used for switching and signaling purposes and which can receive switches, floor indicators and traveling direction indicators in a housing, is shown in the Swiss patent specification CH 270 934. The housing is set into a wall recess and terminated flush with the wall by a cover plate. In the case of elements which are used as traveling direction indicators, incandescent bulb holders are arranged in the housing with incandescent bulbs. In that case, a glass pane carrying an arrow is positioned in a recess at the upper rim of the housing and a transparent matte glass pane is inserted into a slot formed in the cover plate.

A disadvantage of the element described above is that expensive wall recesses are required, which appreciably increase on-site assembly operations. Normally, the wall recesses must be formed during the construction of the building. For this purpose, personnel expert in elevator systems are required at the building site before the actual elevator assembly. A further disadvantage is that, in the case of subsequent modification or modernization of an elevator plant, the wall recesses can not be relocated at any desired locations about the elevator portal without increased effort and expense.

SUMMARY OF THE INVENTION

The present invention concerns an apparatus for indicating the operation of an elevator. The invention avoids the disadvantages of the above-described known indicating devices by providing an indicating element which can be mounted without a wall recess which otherwise might impair the aesthetic appearance of the elevator portal.

The indicating element comprises a generally rectangular box-shaped housing having at least one open side and a front wall with an opening formed therein, the housing including a filter plate set into the opening in the front wall and a plurality of threaded bolts attached to and extending from an inner surface of the front wall of the housing. A generally flat indicating device has a lens carrier mounted in the housing, the lens carrier having a front wall with at least one lens formed therein and a printed circuit board forming a rear wall spaced from the front wall of the lens carrier. The lens is shaped as a desired symbol and is encircled by a protruding lens housing formed on and extending from a rear face of the lens carrier front wall. A plurality of luminescent diodes are mounted on the printed circuit board and are electrically connected to form the desired symbol. The diodes extend into the lens housing for generating light which is transmitted in focus by the lens to the filter plate.

A plurality of nuts threadably engage the bolts on the housing and the lens carrier has a plurality of straps formed thereon with the bolts extending through apertures formed in the straps for retaining the lens carrier against the filter plate. A base plate has apertures formed therein for retaining threaded fasteners for attachment to a wall surface. The housing is detachably coupled to the base plate at the open side of the housing since the base plate has opposed bent ends formed thereon and setscrews and pins are attached to the housing for releasably engaging the bent ends of the base plate. An insulating plate for protecting the printed circuit board against short circuits is located between the base plate and the lens carrier.

The advantages achieved by the present invention are that any arrangement of the indicating element is possible, independent of building construction, thanks to the simple mounting of the indicating element. A further advantage is that the indicating element offers protection to a large extent against unauthorized opening.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
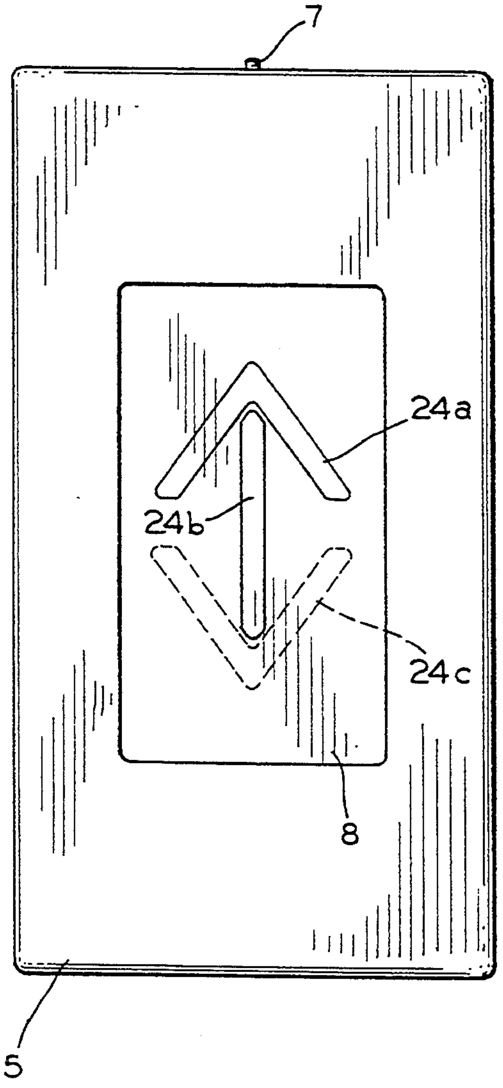
FIG. 1 is a front elevation view of the indicating element according to the present invention.
Figure 2:
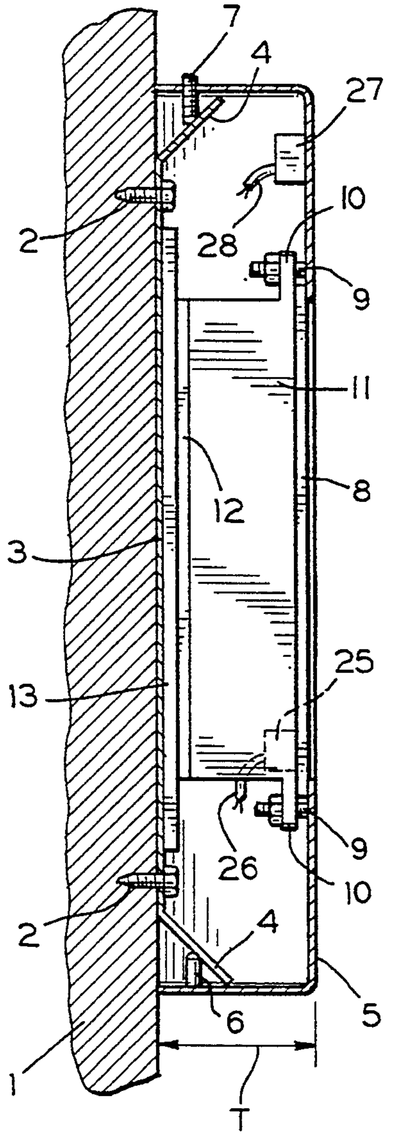
FIG. 2 is a side elevation view in cross section of the indicating element shown in the FIG. 1.

In the FIGS. 1 through 6, there is shown a surface mounted elevator indicating element according to the present invention. A wall 1, shown in the FIG. 2, provides a relatively flat vertical surface on which a base plate 3 is mounted by means of threaded fasteners such as screws 2 extending through apertures formed in the base plate. The base plate 3 is generally rectangular in shape with longer, generally vertically extending side edges and shorter, generally horizontally extending end edges 4, which ends are bent outwardly. A housing 5 is of generally rectangular box shape with an open rear side facing the wall 1. A pair of pins 6, which detachably couple the housing 5 with the lower one of the bent ends 4, are attached to and extend inwardly from a lower side wall of the housing 5. A pair of setscrews 7 threadably engage and extend through an upper side wall of the housing 5 to detachably couple the housing with the upper one of the bent ends 4 of the base plate 3. The depth of the housing 5, or the projection of the housing 5 from the wall 1, is denoted by T.

A closed front side of the housing 5 has an opening formed therein into which a filter plate 8 is set. Threaded fasteners such as bolts or studs 9, which are attached to an inner face of the front side of the housing 5 near the upper and lower edges of the opening, retain a lens carrier 11. The fasteners 9 extend through apertures formed in straps or lugs 10 which extend outwardly from the shorter end walls of the lens carrier 11. A front surface of the lens carrier 11 is pressed against a rear surface of the filter plate 8 by nuts threadably engaged against opposite sides of the straps 10. On the rear side of the lens carrier 11, a printed circuit board 12 having a facing black surface is mounted. An insulating plate 13 is positioned on a front side of the base plate 3 to protect the printed circuit board 12 against short circuits.

Figure 3:
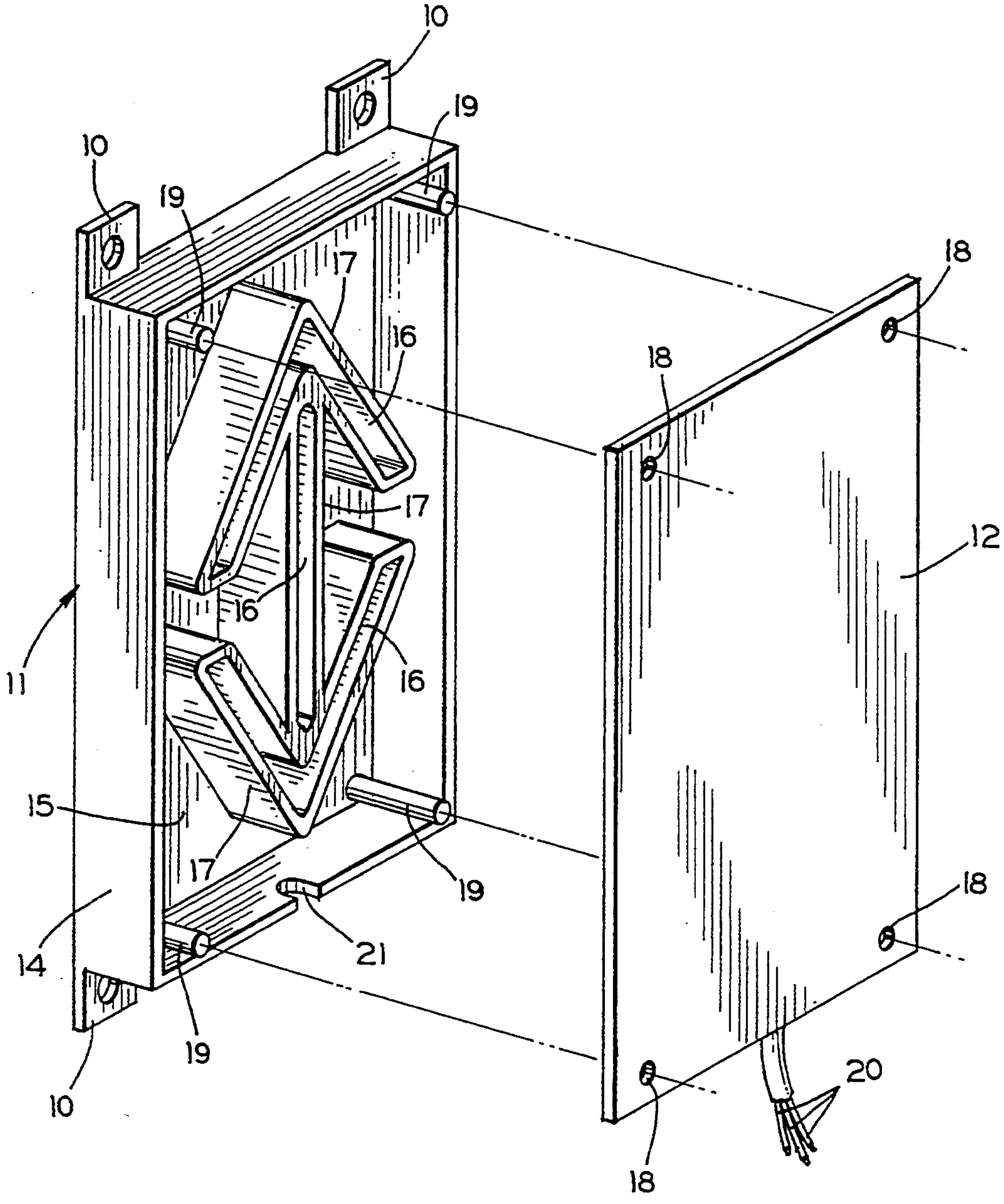
FIG. 3 is an exploded perspective view of a lens carrier and co-operating printed circuit of the indicating element shown in the FIGS. 1 and 2.
Figure 4:
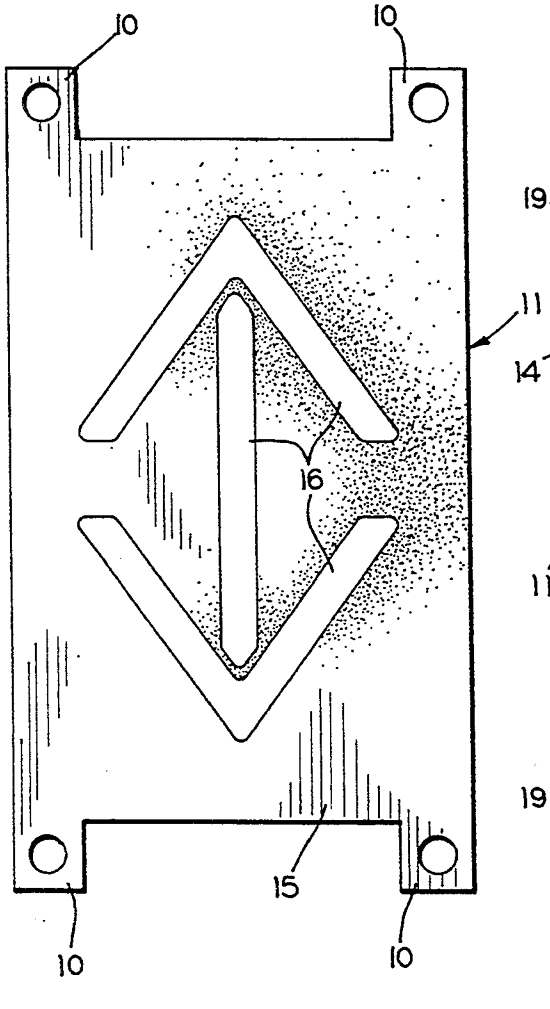
FIG. 4 is a front elevation view of the lens carrier shown in the FIG. 3.
Figure 5:
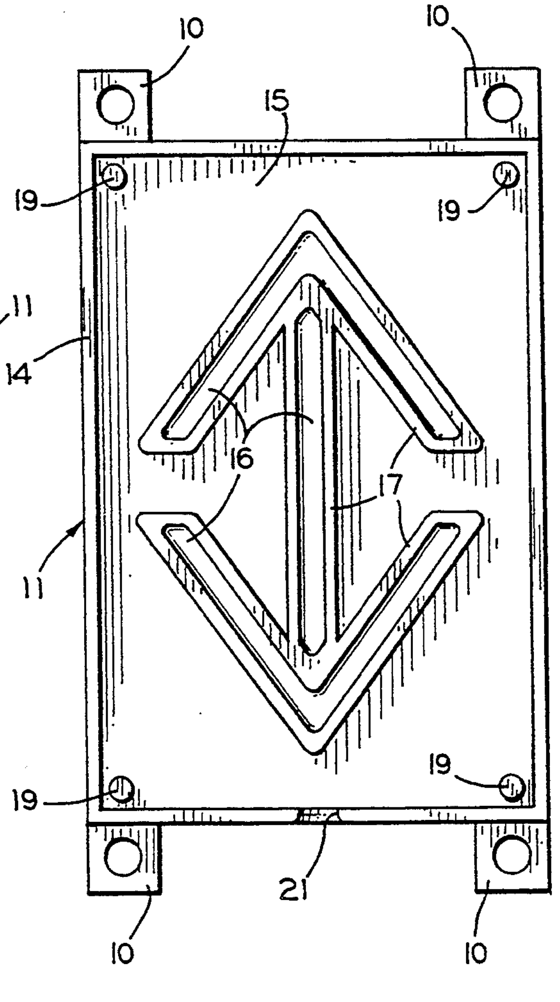
FIG. 5 is a rear elevation view of the lens carrier shown in the FIG. 3.

As best shown in the FIGS. 3–5, the lens carrier 11 includes a carrier frame 14 of generally rectangular box shape with the straps 10 extending therefrom and a front carrier wall 15 having an inner black surface. Lenses 16, which are shaped in accordance with the symbol to be displayed, are mounted in the carrier wall 15. The lenses 16 are encompassed or encircled by inwardly projecting lens housings 17 formed on the inner face of the carrier wall 15. An open rear side of the lens carrier 11 is terminated by the printed circuit board 12 which is retained by carrier pins 19 which are attached to and extend inwardly from the inner face of the wall 15. The carrier pins 19 engage apertures 18 formed in the corners of the printed circuit board 12. Connecting wires 20, which are provided for the transmission of driving signals to switching circuits arranged on the printed circuit 12, exit the closed lens carrier 11 by way of a cutout 21 formed in a lower side wall of the carrier frame 14.

Figure 6:
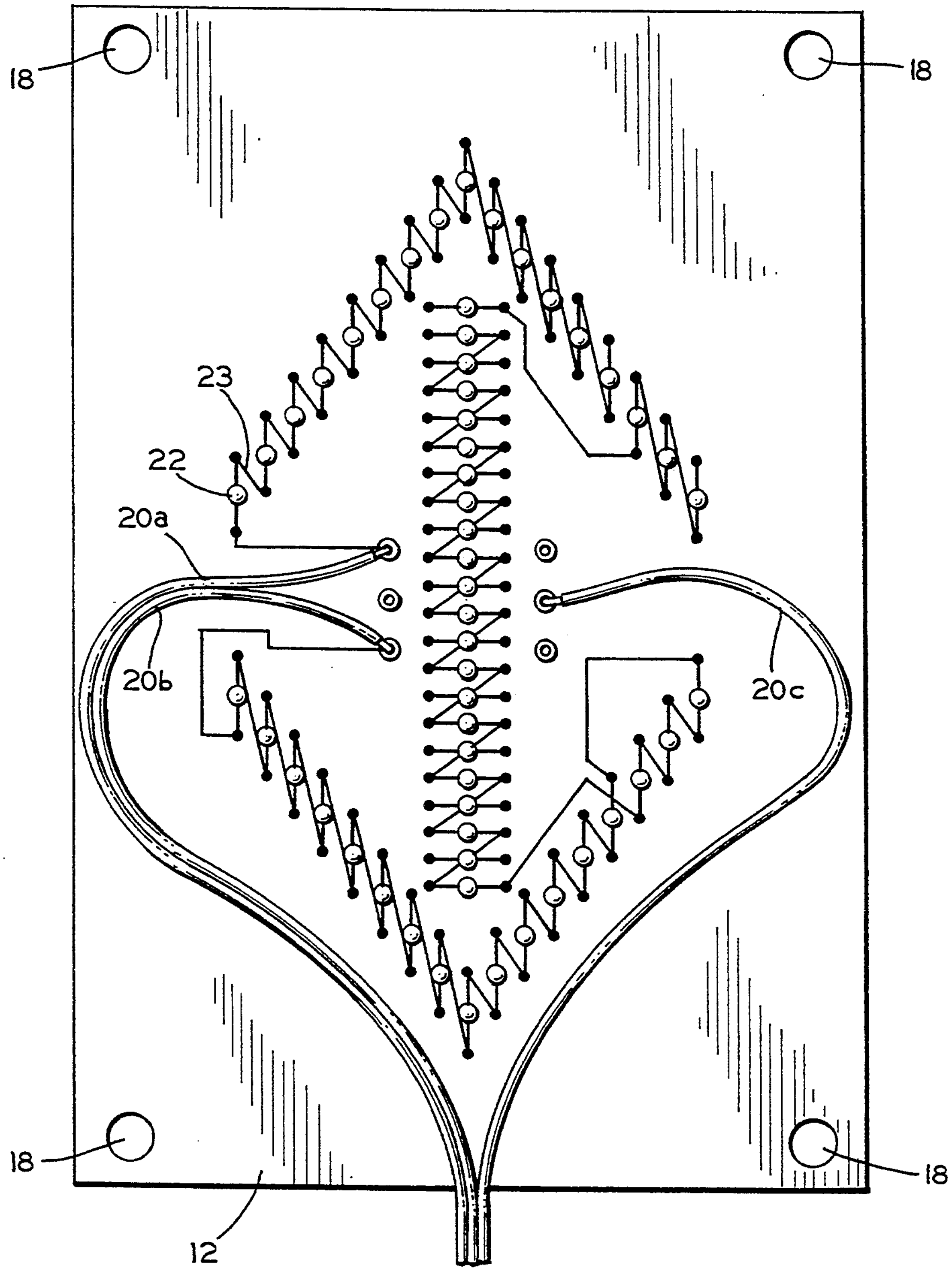
FIG. 6 is a front elevation view of the printed circuit board shown in the FIG. 3.

As best shown in the FIG. 6, a plurality of luminescent diodes 22, which are wired in series and connected electrically one with the other by means of conductor tracks 23 formed on a forwardly facing surface of the printed circuit board 12, are arranged in a raised arrow shape on the printed circuit board 12. A first one 20*a* of the connecting wires 20 is connected to drive the upwardly directed arrow point and the arrow beam or shaft. A second one 20*h* of the connecting wires 20 is connected to drive the downwardly directed arrow point and the arrow beam or shaft. A third one 20*c* of the connecting wires 20 serves as common return conductor. When the lens carrier 11 is closed, the luminescent diodes 22 extend into the lens housing 17 (FIG. 5) so that the light generated by the diodes 22 is directed through the lenses 16 and is transmitted in focus outwards onto the filter plate 8. For example, as shown in the FIG. 1, light in the form of an upwardly directed arrow 24*a* and light in the form of an arrow beam or shaft 24*b* is visible through the filter plate 8 while an unlighted downwardly directed arrow 24*c* remains hidden.

In addition to the illustrated lighted symbols, the present invention can also include one or more devices 25 such as micromechanical pressure switches or capacitive switches located in the housing 5. The device 25 has an electrical lead 26 for generating a signal when actuated and can be used as a floor call transmitter. Also, an acoustic device 27, such as a speaker for the communication of audible information to the passengers, can be located in the housing 5. The device 27 has a cable 28 for receiving information in the form of electrical signals.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A surface mounted indicating element for elevators having indicating devices which are located in a housing and signal the operational state of an associated elevator comprising:

a generally rectangular box-shaped housing having at least one open side, a front side with an opening formed therein and side walls attached to said front side and surrounding said open side, said housing including a filter plate set into said opening in said front side and a plurality of threaded bolts attached to and extending rearwardly from said front side of said housing;

a generally flat indicating device having a lens carrier mounted in said housing, said lens carder having a front wall with at least one lens formed therein and a printed circuit board forming a rear wall spaced from said front wall of said lens carrier, and wherein said lens is positioned behind said filter plate in said opening in said front side of said housing, is shaped as a desired symbol and is encircled by a protruding lens housing formed on and extending from a rear face of said lens carrier front wall, and a plurality of luminescent diodes mounted on said printed circuit board and electrically connected to form the desired symbol, said diodes extending into said lens housing for generating light which is transmitted in focus by said lens to said filter plate;

a plurality of nuts and wherein said lens carrier has a plurality of straps formed thereon, said bolts extending through apertures formed in said straps and threadably engaging said nuts for retaining said lens carrier against said filter plate;

a base plate having means for attachment to a wall surface; and means for detachably coupling said housing to said base plate at said one open side of said housing including a pair of opposed bent ends formed on said base plate and at least one setscrew and at least one pin attached to said housing side walls for releasably engaging associated ones of said bent ends of said base plate whereby when said base plate is mounted on a wall surface, said base plate extends into said open side of said housing and said housing is drawn against the wall surface by rotating said setscrew into engagement with said associated one of said bent ends.

2. A surface mounted indicating element for elevators having indicating devices which are located in a housing and signal an operational state of an associated elevator comprising:

a generally box-shaped housing having a generally planar front side with at least one aperture formed therein, side walls extending rearwardly from said front side a predetermined depth and an open back side for facing toward a wall surface:

an indicating device mounted in said housing and visible through said aperture in said front side of said housing for signaling an operational state of an associated elevator;

a generally planar base plate having edges and means for attachment to a wall surface, at least a portion of one of said edges being bent outwardly from said base plate and extending forwardly less than said predetermined depth; and means for detachably coupling said housing to said base plate including said portion of said one edge of said base plate and fastener means attached to said housing, said fastener means including at least one threaded fastener threadably engaging and extending through one of said side walls of said housing an end of said threaded fastener contacting said portion of said one edge of said base plate, whereby when said base plate is attached to a wall surface, said one edge of said base plate extends into said open back side of said housing and said fastener means releasably engages said portion of said one edge of said base plate, said housing being drawn against the wall surface as said threaded fastener is rotated in contact with said .portion of said one edge of said base plate and said base plate and said housing enclosing said indicating device and said housing covering said base plate with said front side projecting approximately said predetermined depth from the wall surface.

3. The indicating element according to claim 2 wherein said fastener means includes at least one threaded fastener threadably engaging and extending through one of said side walls of said housing, an end of said threaded fastener contacting said portion of said one edge of said base plate whereby said housing is drawn against the wall surface as said threaded fastener is rotated in contact with said portion of said one edge of said base plate.

4. A surface mounted indicating element for elevators having indicating devices which are located in a housing and signal an operational state of an associated elevator comprising:

a housing having a closed front side with an opening formed therein, a side wall attached about a periphery of said front side and extending rearwardly to an open rear side, said side wall extending a predetermined depth from said front side to said rear side of said housing and having upper and lower side wall portions;

an indicating device mounted in said housing and visible through said opening in said front side for signaling an operational state of an associated elevator, said indicating device including a filter plate and a lens carrier, said filter plate abutting a rear surface of said front side of said housing at said opening, said lens carrier having a front wall with at least one lens formed therein and a printed circuit board forming a rear wall spaced from said front wall of said lens carrier, and including means for retaining said lens carrier against said filter plate and said filter plate against said rear surface of said front side of said housing;

a generally planar base plate having means for attachment to a wall surface and upper and lower end edges extending forwardly from said base plate and adjacent to said upper and lower wall portions respectively, said upper and lower end edges extending forwardly less than said predetermined depth;

first means for detachably coupling said housing to said base plate fixedly attached to one of said upper and lower side wall portions; and second means for detachably coupling said housing to said base plate removably attached to the other one of said upper and lower side wall portions whereby when said base plate is attached to a wall surface and said first and second means for detachably coupling releasably engage said upper and lower end edges of said base plate with said base plate positioned in said open rear side, said base plate and said housing enclose said indicating device, said housing completely covers said base plate and said front side of said housing projects outwardly from the wall surface by approximately said predetermined depth.

5. The indicating element according to claim 4 wherein said first means detachably coupling is a fixed pin attached to an interior surface of one of said upper and lower side wall portions of said housing for releasably engaging a respective one of said upper and lower end edges of said base plate and said second means for detachably coupling is a setscrew extending through the other one of said upper and lower side wall portions of said housing for releasably engaging a respective one of said upper and lower end edges of said base plate.

6. The indicating element according to claim 4 wherein said lens is shaped as a desired symbol and is encircled by a protruding lens housing formed on and extending from a rear face of said carrier wall and including a plurality of luminescent diodes mounted on said printed circuit board and electrically connected to form the desired symbol, said diodes extending into said lens housing for generating light which is transmitted in focus by said lens to said filter plate.

7. The indicating element according to claim 4 wherein said lens carrier front wall has at least two lenses formed therein and wherein said lenses are shaped as different desired symbols and each said lens is encircled by a protruding lens housing formed on and extending from a rear face of said carrier wall, and including a plurality of luminescent diodes mounted on said printed circuit board and electrically connected to form the desired symbols, said diodes extending into associated ones of said lens housings for generating light which is transmitted in focus by said lenses to said filter plate.

8. The indicating element according to claim 4 including at least one switch mounted in said housing for generating a floor call.

9. The indicating element according to claim 4 including an acoustic device mounted in said housing for the communication of audible information to passengers for the associated elevator.

* * * * *

UNITED STATES PATENT AND TRADEMARK OFFICE

CERTIFICATE OF CORRECTION

PATENT NO. : 5,379,865

DATED : January 10, 1995

INVENTOR(S) : Edward Berdich, Peter Draper and Timothy Shea

It is certified that error appears in the above-indentified patent and that said Letters Patent is hereby corrected as shown below:

Column 3, line 33, the reference numeral "20h" should read --20b--.
Claim 1, lines 5 through 13 should be in single paragraph form and in line 15, the word "carder" should read --carrier--.
Claim 2, line 24, should end with a comma.
Cancel Claim 3.
Claim 4, line 1 "4" should read --3--.
Claim 5, line 1, "5" should read --4-- and "4" should read --3--; and in line 2, after the word "means", insert --for--.
Claim 6, line 1, "6" should read --5-- and "4" should read --3--.
Claim 7, line 1, "7" should read --6-- and "4" should read --3--.
Claim 8, line 1, "8" should read --7-- and "4" should read --3--.
Claim 9, line 1, "9" should read --8-- and "4" should read --3--.

Signed and Sealed this

Thirty-first Day of October 1995

Attest:

BRUCE LEHMAN

*Attesting Officer*

*Commissioner of Patents and Trademarks*